(12) United States Patent
Post (10) Patent No.: US 10,298,090 B2
(45) Date of Patent: May 21, 2019

(54) ELECTROSTATIC GENERATOR/MOTOR ELECTRODES LOCATED ON THE INNER SURFACE OF AN ELECTROMECHANICAL BATTERY ROTOR

(71) Applicant: Lawrence Livermore National Security, LLC, Livermore, CA (US)

(72) Inventor: Richard F Post, Walnut Creek, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 273 days.

(21) Appl. No.: 15/076,472

(22) Filed: Mar. 21, 2016

(65) Prior Publication Data

US 2017/0054343 A1    Feb. 23, 2017

Related U.S. Application Data

(60) Provisional application No. 62/207,341, filed on Aug. 19, 2015.

(51) Int. Cl.
| | | |
|---|---|---|
| *H02K 7/02* | (2006.01) | |
| *H02N 1/08* | (2006.01) | |
| *H01M 14/00* | (2006.01) | |
| *H02K 7/00* | (2006.01) | |
| *H02N 1/00* | (2006.01) | |

(52) U.S. Cl.
CPC ............ *H02K 7/025* (2013.01); *H01M 14/00* (2013.01); *H02N 1/08* (2013.01); *Y02E 60/16* (2013.01)

(58) Field of Classification Search
CPC ......... H02K 7/025; H02K 7/02; H01M 14/00; H02N 1/00; H02N 1/08; H02N 1/06; H02N 1/002; Y02E 60/16
See application file for complete search history.

(56) References Cited

U.S. PATENT DOCUMENTS

| | | | | |
|---|---|---|---|---|
| 2,009,503 A | * | 7/1935 | Landwerlin | H02N 1/08 310/309 |
| 2,194,839 A | * | 3/1940 | Van De Graaff | H02N 1/08 310/309 |
| 2,247,783 A | * | 7/1941 | Massolle | H02M 7/54 310/112 |

(Continued)

FOREIGN PATENT DOCUMENTS

WO    WO 2017030846 A1 *  2/2017  ............ H02K 7/025

OTHER PUBLICATIONS

International Search Report and Written Opinion for PCT/US16/046246, corresponding to U.S. Appl. No. 15/076,472, 9 pages.

*Primary Examiner* — Edgardo San Martin
(74) *Attorney, Agent, or Firm* — John P. Wooldridge (57) ABSTRACT

A geometric design of E-S generator/motor electrodes mounted on the inner surface of a fiber-composite rotor is provided. The electrode configuration is able to sustain very high g levels. The rotor may be formed of carbon-fiber wound on top of an inner E or S-glass fiber composite core. The electrode design provides the needed area to satisfy the power requirements of the storage system and utilizes a stacked wedge-like electrode array that both solves the high-g problem and results in a doubling or tripling of the electrode area, relative to that of electrodes that conform to the inner cylindrical surface of the rotor.

15 Claims, 7 Drawing Sheets

(56) References Cited

U.S. PATENT DOCUMENTS

| | | | | |
|---|---|---|---|---|
| 2,486,140 | A * | 10/1949 | Felici | H02N 1/08 310/309 |
| RE23,460 | E * | 2/1952 | Felici | H02N 1/08 310/309 |
| 3,039,011 | A * | 6/1962 | Gale | H02N 1/08 310/309 |
| 3,107,326 | A * | 10/1963 | Denholm | H02N 1/06 310/309 |
| 3,143,671 | A * | 8/1964 | Gale | H02N 1/08 307/110 |
| 3,700,983 | A * | 10/1972 | Goetzl | H01G 5/0138 361/279 |
| 4,789,802 | A * | 12/1988 | Miyake | H02N 1/08 310/308 |
| 4,870,310 | A * | 9/1989 | Triplett | F03G 3/08 310/74 |
| 6,236,127 | B1 * | 5/2001 | Bornemann | F16C 32/0438 310/178 |
| 6,867,520 | B2 * | 3/2005 | Jennings | F16C 32/0493 310/74 |
| 7,834,513 | B2 | 11/2010 | Post | |
| 8,264,121 | B2 * | 9/2012 | Post | H02N 1/08 310/309 |
| 9,270,203 | B2 * | 2/2016 | Post | H02N 1/00 |
| 9,614,462 | B2 * | 4/2017 | Post | H02N 1/08 |
| 9,634,551 | B2 * | 4/2017 | Rabal | H02K 47/14 |
| 9,899,937 | B2 * | 2/2018 | Ge | H02N 1/006 |
| 9,923,501 | B2 * | 3/2018 | Rabal | H02K 7/025 |
| 2005/0006980 | A1 | 1/2005 | Horst | |
| 2005/0218741 | A1 | 10/2005 | Wnorowski, Jr. et al. | |
| 2010/0237629 | A1 * | 9/2010 | Gray | F16C 32/044 290/1 R |
| 2012/0267974 | A1 | 10/2012 | Lebenbom | |
| 2013/0020900 | A1 | 1/2013 | Takeuchi | |
| 2014/0265688 | A1 | 9/2014 | Post | |
| 2017/0054385 | A1 * | 2/2017 | Post | H02N 1/08 |
| 2017/0271943 | A1 * | 9/2017 | Groves | H02K 7/025 |
| 2018/0013331 | A1 * | 1/2018 | Post | H02K 7/025 |

\* cited by examiner

ELECTROSTATIC GENERATOR/MOTOR ELECTRODES LOCATED ON THE INNER SURFACE OF AN ELECTROMECHANICAL BATTERY ROTOR

CROSS-REFERENCE TO RELATED APPLICATIONS

This application claims the benefit of U.S. Provisional Patent Application No. 62/207,341 titled "Improved Design for Electrostatic Generator/Motor Electrodes Located on the Inner Surface of an EMB Rotor," filed Aug. 19, 2015, incorporated herein by reference.

STATEMENT REGARDING FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

BACKGROUND OF THE INVENTION

Field of the Invention

The present invention relates to electromechanical battery (EMB) electrode design, and more specifically, it relates to means for overcoming the high g load on the rotor electrodes of an EMB.

Description of Related Art

In the design of EMB flywheel energy storage modules utilizing high strength fiber composite rotors and electrostatic generator/motors, the electrodes of such modules must withstand very high centrifugal forces. This situation is particularly evident for small rotors (e.g., diameters of 10 cm or less) that may operate at speeds in excess of 200,000 RPM. In such modules, the centrifugal force at the inner surface of the rotor may be of in excess of a million g, implying that an item weighing only 1 gram on the inner surface of the rotor will have an equivalent weight of over 1 metric ton. Since even the lightest electrode structure for the rotor can be expected to weigh tens of grams, its equivalent "weight" can be of order 10 to 100 metric tons. This centrifugal force will be exerted on the inner surface of the rotor. A simple and practical solution to this high-g load problem is desirable. A means of increasing the rotor electrode area by a substantial factor relative to the area of the inner surface of the rotor is also desired since increasing the electrode area of an E-S generator results in a proportionate increase in power output from the generator.

SUMMARY OF THE INVENTION

This invention pertains to the geometric design of E-S generator/motor electrodes mounted on the inner surface of a fiber-composite rotor. Particularly in small EMB rotors, the centrifugal g-forces are very high so that the E-S rotor electrode design must be such as to be able to sustain these forces. In addition, if the rotor is fabricated from carbon-fiber composite, its electrical conductivity would interfere with the proper operation of the E-S generator/motor electrodes. Since carbon-fiber rotors are commonly wound on top of an inner E or S-glass fiber composite core, mounting the electrodes on the inner surface both can solve the high-g problem and the carbon-fiber conductivity problem. The issue then is to achieve the needed area to satisfy the power requirements of the storage system. This problem is most evident in vehicular applications. This invention pertains to a design that employs a stacked wedge-like electrode array that both solves the high-g problem and results in a doubling or tripling of the electrode area, relative to that of electrodes that conform to the inner cylindrical surface of the rotor. The invention can be used in flywheel storage systems or other rotating machinery, including for vehicular or stationary use.

BRIEF DESCRIPTION OF THE DRAWINGS

The accompanying drawings, which are incorporated into and form a part of the disclosure, illustrate embodiments of the invention and, together with the description, serve to explain the principles of the invention.

DETAILED DESCRIPTION OF THE INVENTION

In the design of the fiber-composite rotors for EMBs, high-strength fibers are embedded in an epoxy matrix. The fibers used include E-glass and the higher-strength S-Glass, basalt fibers, and carbon fibers such as IMS65 and the highest strength carbon fiber, T1000 (tensile strength 7 Gpa, i.e., about 1 million psi). In the context of this invention, it is important to note two circumstances. First, it should be noted that carbon fiber composites are electrically conducting and this fact must be considered when designing the electrode system for an E-S generator/motor to be mounted on the rotor. The second circumstance relates to a rotor design practice that is commonly employed when designing and constructing carbon-fiber composite rotors. That is, in filament winding of the rotor, the innermost composite layers are made using S-glass instead of carbon fiber. This two-layer design is employed because carbon-fiber composites are highly sensitive to the presence of point loads, while S-Glass composites are much less sensitive. Centrifugal stresses within the S-glass composite are transferred in part to the high-modulus carbon-fiber composite so that the S-glass is not stressed above its safe working limit.

The first circumstance implies that when the outer part of the rotor body is composed of carbon-fiber composite, its electrical conductivity precludes the location of the conducting strips required for the electrodes on the outer surface of the rotor. In such a case, the conductivity of that part of the rotor surface lying between the strips would greatly vitiate the performance of the E-S generator. Thus, for carbon fiber composite rotors to be made compatible with the use of surface-mounted rotor electrodes, these electrodes must be located on the inner surface of the rotor, and that inner part of the rotor must be non-conducting, i.e., it must be composed of glass, or basalt fiber composite.

The next issue faced by the designer is to insure that the electrode area is Sufficiently large to generate the power required by the application. If the application of the EMB is the bulk storage of energy, with hours-long charging and discharging times, then simple designs can be used. An example would be to use vertical strips of metal foil or metallic coating on the inner surface of the rotor. However if the peak power demands are substantially higher, as they would be in vehicular applications, for example, then a higher electrode area would likely be required. The invention thus addresses two issues: (1) Dealing with high-g centrifugal force fields, and (2) Increasing the electrical capacitance and the maxi/min capacity ratio of the E-S electrode system.

Figure 1A:
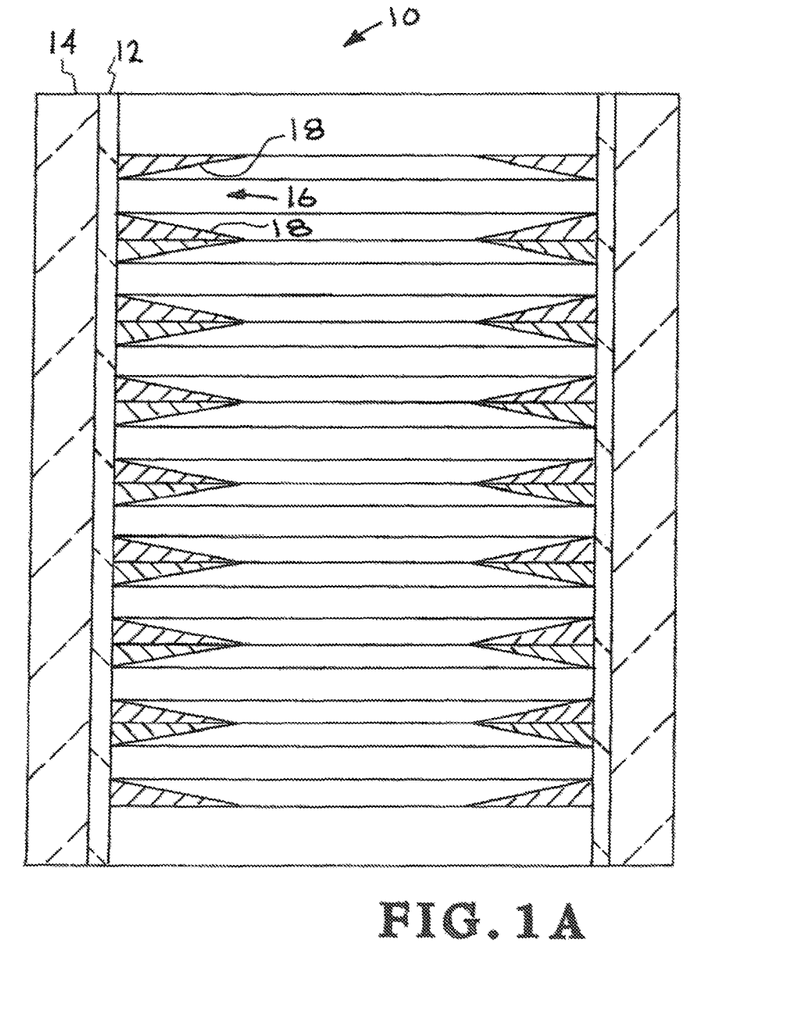
FIG. 1A is a schematic section drawing of an EMB rotor comprising a carbon fiber wound on top of an inner E- or S-glass fiber composite core with rotor electrode support rings on the inside surface of the rotor.
Figure 1B:
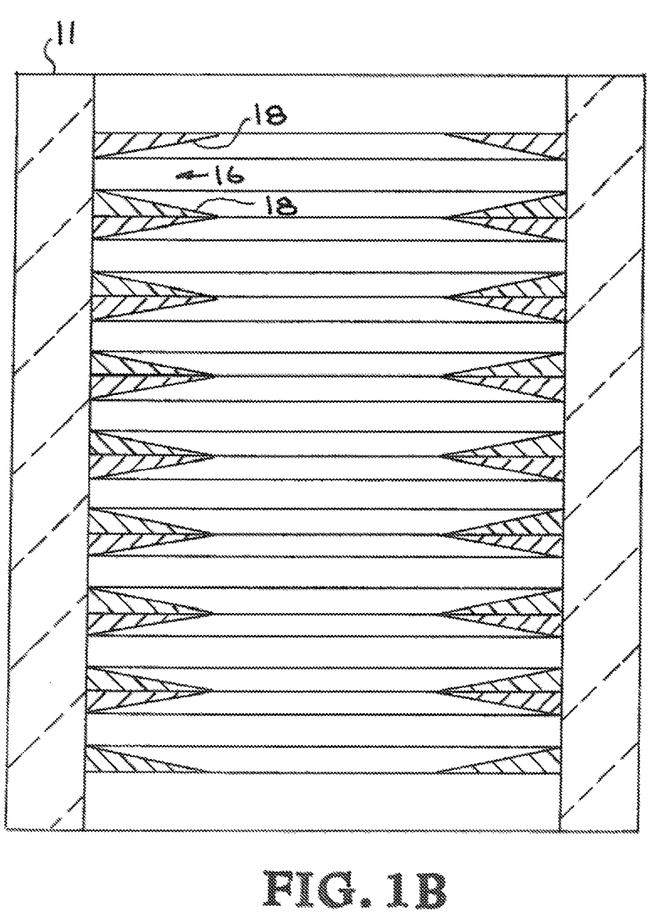
FIG. 1B is a schematic section drawing of an electrically non-conducting EMB rotor with rotor electrode support rings on the inside surface of the rotor.
Figure 1C:
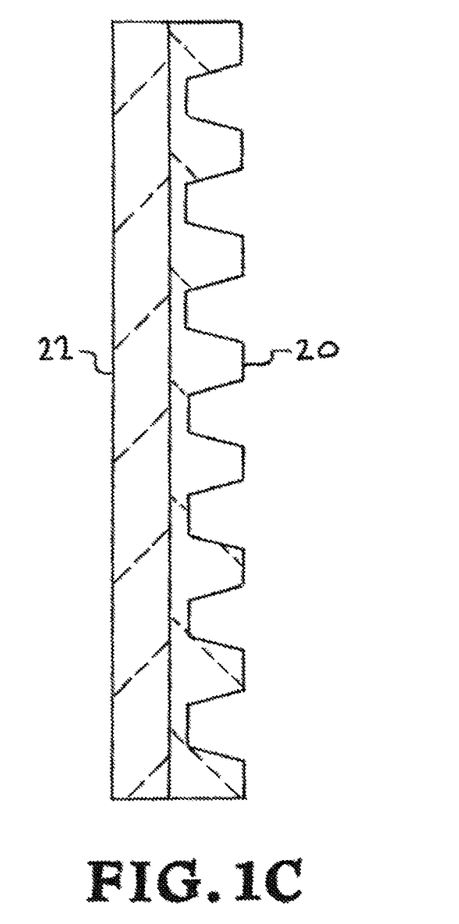
FIG. 1C is a schematic section drawing of an EMB rotor comprising a carbon fiber wound on top of an inner E- or S-glass fiber composite core, where the inner core has been machined to form slots.
Figure 1D:
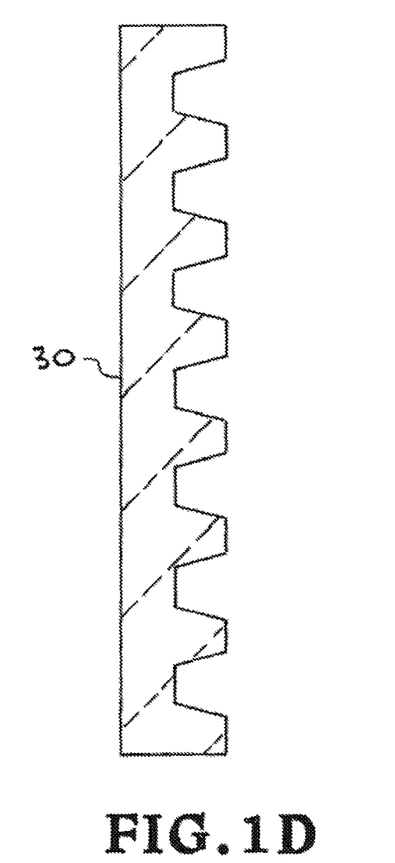
FIG. 1D is a schematic section drawing of an electrically non-conducting EMB rotor where its inner surface has been machined to form slots.
Figure 2:
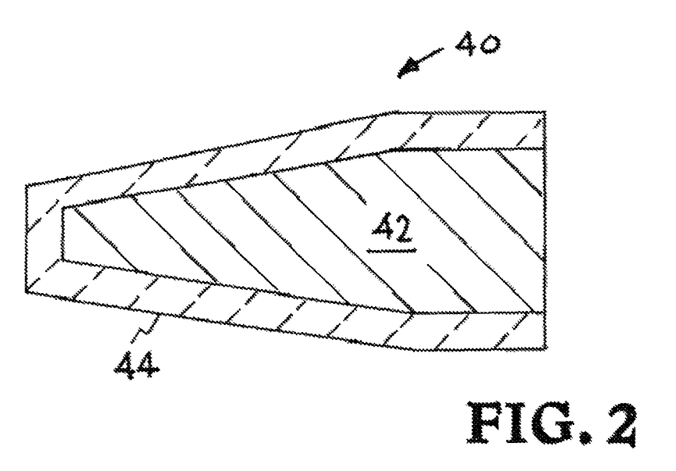
FIG. 2 is a schematic section drawing of a stator electrode end.

The basic concept of the new system is illustrated schematically in the section views shown in FIGS. 1 and 2.

FIG. 1A shows a sectional view of hollow cylindrical rotor 10, which is formed of a non-conducting core 12 within a carbon fiber composite 14. The inner stir face of the rotor 10 has been configured to include multiple vertically spaced cells 16, bounded on their upper and lower surfaces by wedge-shaped fiber-composite separator rings 18. One exemplary embodiment of the rings is formed of G-10 glass and another is formed of fiberglass. Other embodiments are possible. Thus, a configuration of cells is achieved by assembling a stack of fiber-composite rings of the proper shape within the inside surface of the glass or basalt fiber-composite inner portion of the rotor. In this embodiment, the separators are made wedge-shaped instead of being constructed as constant-thickness thickness in order to minimize the compressive stresses that will occur at their bases, however, other shapes are within the scope of the invention. Note that is can be beneficial to make the tips of the rings 18 to be rounded rather than points pointed tips tend to have a lower breakdown voltage. Likewise, the troughs of the cells can benefit from having rounded corners rather than sharp corners. This same principle applies to all of the electrode configurations described herein. Keeping these stresses within their limiting value will also determine the maximum value of the ratio of the outer radius of these rings to their inner radius FIG. 1B is a sectional view that shows a configuration where rotor 11 is conductive and where the inner non-conducting core of FIG. 1A is omitted.

An alternate configuration of cells can be achieved by machining slots on the inner surface of the rotor as shown in the sectional view of FIG. 1C. In this configuration, the inner surface is machined in an electrically non-conducting core 20 around which is wound a carbon fiber composite 22. Note that the core 20 can beneficially have all rounded or beveled corners to increase the electrical breakdown voltage. FIG. 1D is a sectional view that shows another rotor configuration having slots machined on the inner surface. In this embodiment, the entire rotor 30 is formed of electrically non-conducting material. Note that the core 20 can beneficially have all rounded or beveled corners to increase the electrical breakdown voltage. As much as possible, the contour of the peaks and troughs should be uniform.

FIG. 2 shows a side sectional view of a blade 40 of the stator. To achieve a high max/min capacity ratio and also to enhance the voltage-holding ability of the electrode system, a tapered cross-section metal electrode 42 is employed. This electrode is then completely sheathed by a high dielectric constant polymer 44, e.g., polyester fiber composite (K=10 at E-S generator frequencies). The max/min ratio for this electrode structure depends upon the structure geometric parameters but can be expected to be 3:1 or greater. Although the figure shows the blade as having corners, it is beneficial if the edges that face the rotor electrodes are rounded or beveled. It is beneficial to have a rounded top, rather than a flat top.

The new conductor array is can be incorporated into a "balanced circuit" system (See FIG. 15 in U.S. Pat. No. 7,834,511 incorporated herein by reference). In using this circuit, the rotor electrodes operate in a "virtual ground" situation. That is, the stator is divided into an upper ("plus" charged) section and a lower ("minus" charged) section. See FIG. 3A, described below. The E-S generator capacitor is thus divided into an upper and lower hall, with the rotor electrodes, which run the full length of the rotor, completing the circuit. These electrodes could be made, for example, of vertical strips of metal foil bonded to the inner corrugated surface of the rotor cell structure. Their positioning would be such as to match the periodicity of the stator electrode system, by incorporating an azimuthal gap between them with the same periodicity. To optimize the max/min capacity ratio, the gaps between the rotor conductor strips might be made wider than the width of the strips themselves.

Figure 3A:
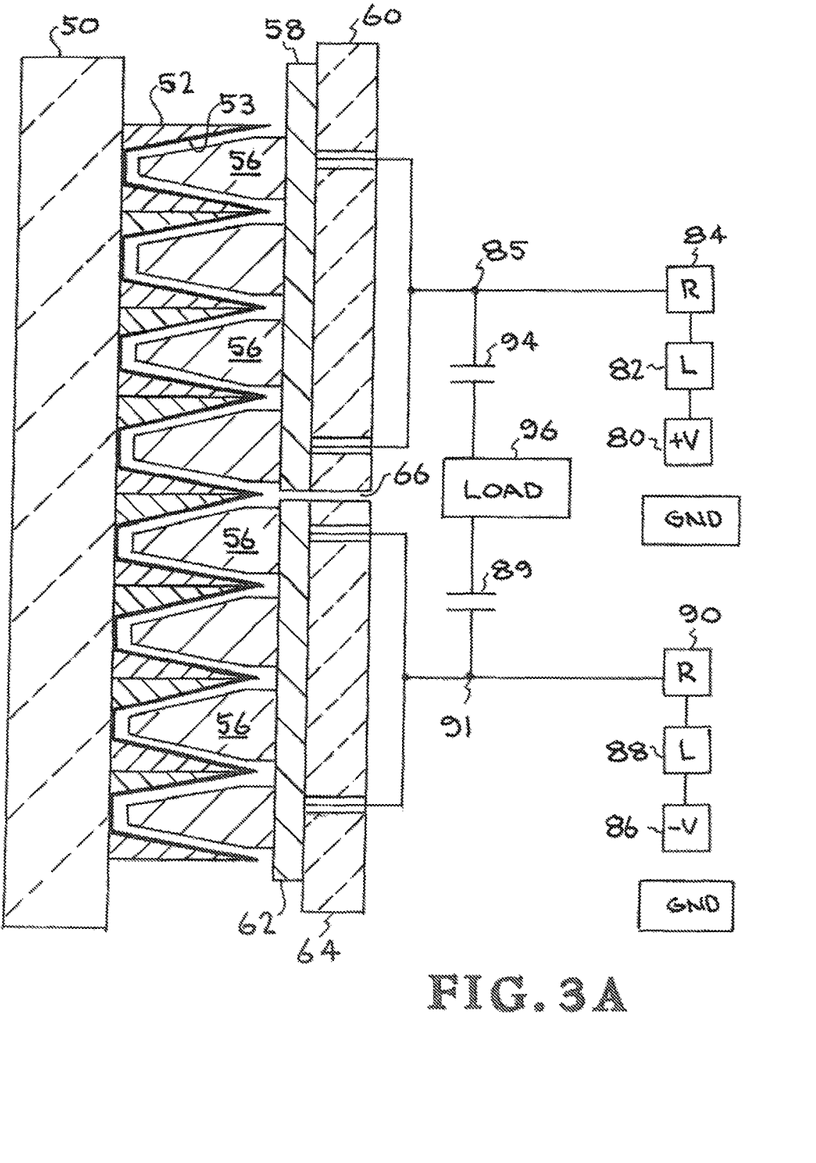
FIG. 3A shows a rotor section of FIG. 1 and shows an upper stator section and a lower stator section where each stator includes arrays of the electrodes of FIG. 2.
Figure 3B:
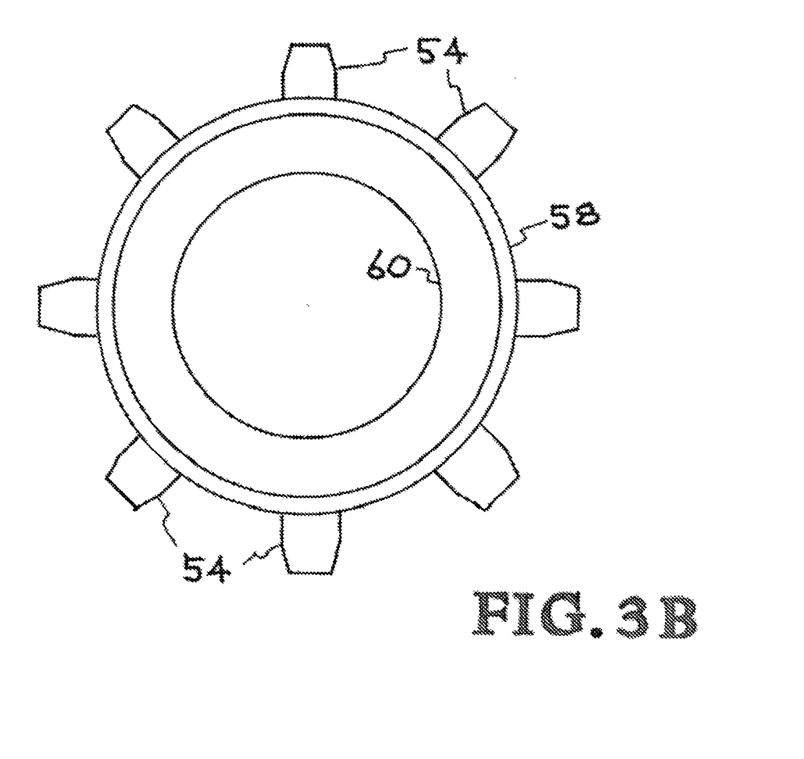
FIG. 3B shows an axial view of the stator of FIG. 3A

More specifically, FIG. 3A shows a sectional view of one side of the rotor 50 which includes the separator rings 52 on which is laid down a conducting strip 53. In this embodiment, the rotor is electrically non-conductive. The figure also shows an upper series of stator electrode blades 54 and a lower series of stator electrode blades 56. The upper series of blades 54 are in electrical contact with conductive strip 58, which is attached to stator section 60. The lower series of blades 56 are in electrical contact with conductive strip 62, which is attached to stator section 64. Notice the gap 66 between stator section 60 and stator section 64. If the upper and lower stator sections are formed of electrically conductive material, the conductive blades 54, 56 can be in direct contact with stator sections 60, 64 and conductive strips 58 and 62 can be omitted. Although the conducting strip 53 is shown as having a pointed peak, it is beneficial if the peak is rounded. Likewise, although the blades 54 and 56 are shown as having flat tops, it is beneficial if they are rounded. Although the blades appear to have non-uniform sizes and dimensions, it is beneficial if they all are as identical as possible. FIG. 3B shows an axial view of the stator of FIG. 3A and shows rotor 60, strip 58 and blades 54. For clarity, a balanced circuit similar to the one shown in FIG. 15 of U.S. Pat. No. 7,834,513 is provided. A source 80 of positive voltage is connected to inductor 82 and resistor 84 and to conductive strip 58. A source 86 of negative voltage is connected to inductor 88 and resistor 90 and to conductive strip 62. Note that it is beneficial if the conducting strip 53 is a plating rather than a foil. Such plating can be formed by vapor deposition. In this embodiment, a connection is made from a node 85 between resister 84 and strip 58 to a node 91 between resistor 90 and strip 62. The connection from node 85 is made to a capacitor 94 and to a load 96 to a capacitor 98 to node 91. Based on the teachings herein, those skilled in the art will understand that other circuits are useable with the configuration of FIG. 3A. Assembly of this and similar embodiments can be accomplished by building or stacking the device from one end of the rotor. For example, starting at the bottom of the rotor 50 with reference to the page, a first ring can be attached to the rotor. Then, a blade is attached to the stator. The assembly process is continued up the rotor. The rotor electrode can be deposited by rotating the rotor such that is does not directly line up with the stator electrodes. It is possible to first fabricate the stator and its blades and then connect the rotor sections around the stator. Similarly, the rotor can be prefabricated and the stator assemble inserted in sections within the inner radius of the cylindrical rotor. Other assembly procedures will be apparent to those skilled in the art based on this disclosure. It is also possible to tithe rotor blades to be rings with non-conducting material located along the longitudinal axis of the stator on its outside wall such that there are conducting blades corresponding to the spacing of the rotor electrodes.

Example Calculations

To demonstrate aspects of the performance of the new electrode geometry, a calculation of the ratio of the capacitor area with the new configuration located on the inner surface of a rotor with a given inner radius to that for electrodes mounted directly on that inner surface. The number of cells of the example was that shown in FIG. 1A. For this case the area ratio was 2.5:1. Higher values could be obtained, if need be, by increasing the number of cells. In addition, a calculation was made of the compressive stress at the base of the wedges in a small rotor with an inside radius of 0.035 m., operated at 250,000 rpm. The calculated stress was 293 MPa, well below the maximum compressive stress value cited in the literature for glass-fiber composite (e.g., G-10 fiber-glass composite, 448 MPa).

Thus, a new electrode configuration has been described, one designed for installation on the inside of the rotor of an EMB, and aimed at the twin objectives of operation at high centrifugal g levels at the same time increasing the electrode an as needed, for example, in vehicular applications. The results of calculations showing the improved performance were also given.

The foregoing description of the invention has been presented for purposes of illustration and description and is not intended to be exhaustive or to limit the invention to the precise form disclosed. Many modifications and variations are possible in light of the above teaching. The embodiments disclosed were meant only to explain the principles of the invention and its practical application to thereby enable others skilled in the art to best use the invention in various embodiments and with various modifications suited to the particular use contemplated. The scope of the invention is to be defined by the following claims.

I claim:

1. An apparatus, comprising:
an open cylindrical rotor having an inner wall and a longitudinal axis of rotation (AOR), wherein said inner wall comprises a rotor electrode mounting surface, wherein the distance from said AOR to said mounting surface periodically varies along the length of said AOR, wherein said surface comprises a series of rings attached to said inner wall, wherein said rings are oriented to be perpendicular to said AOR, wherein each ring of said series of rings has a base and a peak, wherein said base is connected to said inner wall, wherein said peak points toward said AOR, wherein said base is wider than said peak, wherein said rotor comprises fibers embedded in an epoxy matrix, wherein said fibers comprise a material selected from the group consisting of E-glass, S-Glass, basalt fibers and carbon fibers and wherein said inner wall is electrically non-conductive; and
rotor electrodes fixedly attached to said mounting surface, wherein said rotor electrodes have a long dimension that is oriented in the direction of said AOR.

2. The apparatus of claim 1, wherein said peak is rounded or beveled.

3. The apparatus of claim 1, wherein each ring of said series of rings comprises material selected from the group consisting of G-10 glass and fiberglass.

4. The apparatus of claim 1, wherein said carbon fiber composite is wound onto a non-conducting core that includes said inner wall.

5. The apparatus of claim 4, wherein said non-conducting core comprises a material selected from the group consisting of glass and basalt fiber.

6. The apparatus of claim 1, wherein said rotor electrodes comprise strips of metal foil.

7. The apparatus of claim 1, wherein said rotor electrodes comprise metallic coating.

8. The apparatus of claim 1, wherein said rotor comprises multiple spaced cells in the direction of said AOR, wherein said cells are bounded on their upper and lower surfaces by said rings.

9. The apparatus of claim 1, wherein said rings are wedge-shaped.

10. The apparatus of claim 1, wherein said mounting surface comprises slots in said inner wall.

11. The apparatus of claim 1, further comprising a stator located within the hollow portion of said open cylindrical rotor, wherein said stator comprises an outer surface; and
stator electrode blades attached to said outer surface, wherein said blades extend radially outward from said outer surface and are periodically spaced azimuthally in rows and columns around said outer surface, wherein as said rotor rotates, said rings are unobstructed by said blades.

12. The apparatus of claim 11, wherein each blade of said blades comprises an electrically conductive portion that is sheathed with dielectric material, except for the portion of said blade that is in electrical contact with said outer surface.

13. The apparatus of claim 12, wherein the edges of said blade that face said rotor electrodes are rounded or beveled.

14. The apparatus of claim 12, wherein azimuthally, the positioning of said blades matches the periodicity of said stator electrodes.

15. The apparatus of claim 1, wherein the gaps between said rotor electrodes are wider than the width of a rotor electrode.

* * * * *